(12) United States Patent
Arai et al.

(10) Patent No.: US 10,394,174 B2
(45) Date of Patent: Aug. 27, 2019

(54) IMAGE FORMING APPARATUS AND IMAGE PROCESSING METHOD

(71) Applicant: FUJI XEROX CO., LTD., Tokyo (JP)

(72) Inventors: Shigeru Arai, Kanagawa (JP); Kaori Tominaga, Kanagawa (JP); Taro Yokose, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/593,369

(22) Filed: May 12, 2017

(65) Prior Publication Data

US 2018/0059600 A1 Mar. 1, 2018

(30) Foreign Application Priority Data

Aug. 31, 2016 (JP) ................................. 2016-169411

(51) Int. Cl.
G06F 3/12 (2006.01)
G03G 15/00 (2006.01)
H04N 1/407 (2006.01)

(52) U.S. Cl.
CPC ..... G03G 15/5025 (2013.01); G03G 15/5087 (2013.01); H04N 1/407 (2013.01); H04N 2201/0094 (2013.01)

(58) Field of Classification Search
CPC ....... G03G 15/5025; H04N 2201/0094; H04N 1/407

USPC ........................ 358/3.01, 1.9, 1.15, 518, 448
See application file for complete search history.

(56) References Cited

U.S. PATENT DOCUMENTS

2007/0188525 A1* 8/2007 Yamanaka ............... H04N 5/20
345/690
2013/0077102 A1* 3/2013 Tomita ............... G06K 15/1886
358/1.2

FOREIGN PATENT DOCUMENTS

| JP | 2007-213460 A | 8/2007 |
| JP | 2009-086463 A | 4/2009 |
| JP | 2009-157513 A | 7/2009 |
| JP | 2009-157656 A | 7/2009 |
| JP | 2010-231112 A | 10/2010 |

* cited by examiner

Primary Examiner — Quang N Vo
(74) Attorney, Agent, or Firm — Sughrue Mion, PLLC

(57) ABSTRACT

An image forming apparatus includes a determination unit and a continuous tone processing unit. The determination unit determines an end of a continuous tone image part in which a density changes continuously, the continuous tone image part being included in image information. The continuous tone processing unit performs, in a case where a number of levels of density of a print image in the image forming apparatus is larger than a number of levels of density of the image information, continuous tone processing for causing a density of a pixel group in which adjacent pixels have a same density to be changed continuously when increasing the number of levels of the density in an end portion of the continuous tone image part.

4 Claims, 12 Drawing Sheets

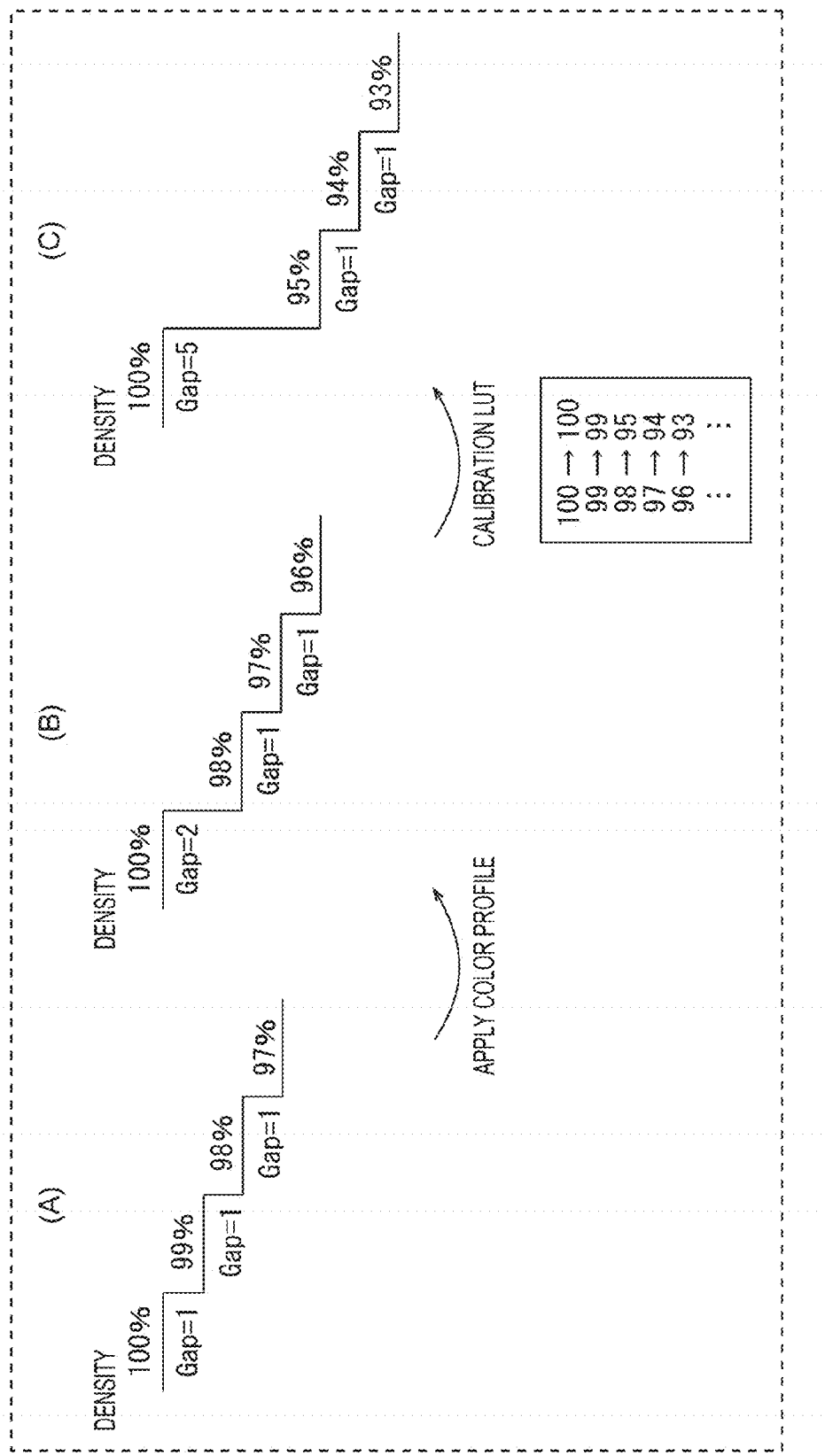

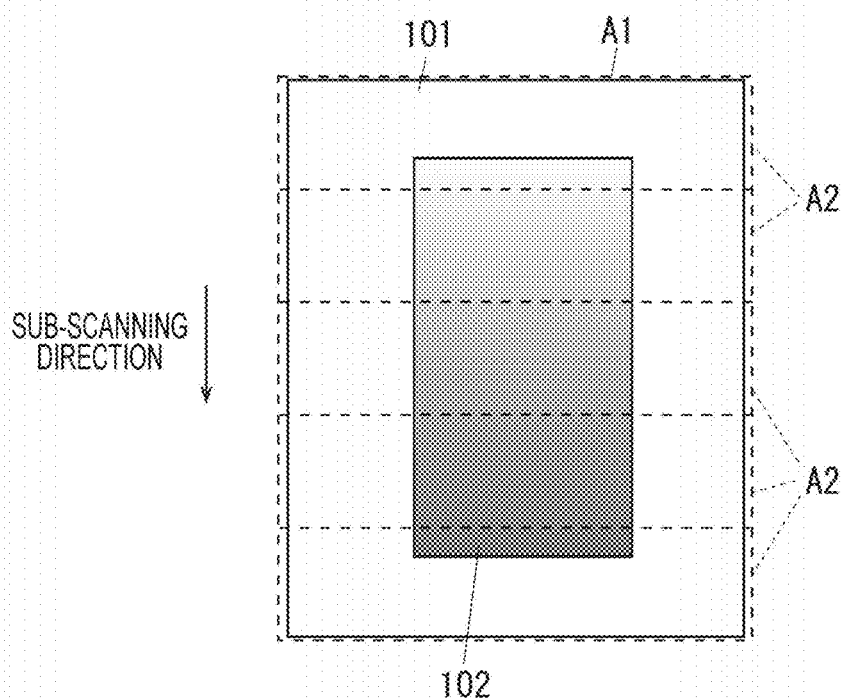

FIG. 6

| | | | RIGHT LEVEL DIFFERENCE (Cb to C0) | | | |
|---|---|---|---|---|---|---|
| | | + | | 0 | − | |
| | | > EDGE THRESHOLD (Cb) | Ca TO Cb | < INTERPOLATION THRESHOLD (Ca) | IMAGE END | < INTERPOLATION THRESHOLD (Ca) | Ca TO Cb | > EDGE THRESHOLD (Cb) |
| LEFT LEVEL DIFFERENCE (Cb to C0) | + | > EDGE THRESHOLD (Cb) | NO INTERPOLATION | NO INTERPOLATION | UPWARD INTERPOLATION | NO INTERPOLATION | DOWNWARD PREDICTION INTERPOLATION | NO INTERPOLATION | NO INTERPOLATION |
| | | Ca TO Cb | DOWNWARD INTERPOLATION | NO INTERPOLATION | NO INTERPOLATION | DOWNWARD PREDICTION INTERPOLATION | DOWNWARD PREDICTION INTERPOLATION | NO INTERPOLATION | NO INTERPOLATION |
| | | < INTERPOLATION THRESHOLD (Ca) | NO INTERPOLATION | NO INTERPOLATION | NO INTERPOLATION | DOWNWARD PREDICTION INTERPOLATION | DOWNWARD PREDICTION INTERPOLATION | DOWNWARD INTERPOLATION | DOWNWARD PREDICTION INTERPOLATION |
| | 0 | IMAGE END | NO INTERPOLATION | UPWARD PREDICTION INTERPOLATION | UPWARD PREDICTION INTERPOLATION | | DOWNWARD PREDICTION INTERPOLATION | NO INTERPOLATION | NO INTERPOLATION |
| | − | < INTERPOLATION THRESHOLD (Ca) | UPWARD PREDICTION INTERPOLATION | UPWARD PREDICTION INTERPOLATION | UPWARD INTERPOLATION | UPWARD PREDICTION INTERPOLATION | NO INTERPOLATION | NO INTERPOLATION | UPWARD PREDICTION INTERPOLATION |
| | | Ca TO Cb | NO INTERPOLATION | NO INTERPOLATION | UPWARD INTERPOLATION | NO INTERPOLATION | DOWNWARD PREDICTION INTERPOLATION | NO INTERPOLATION | NO INTERPOLATION |
| | | > EDGE THRESHOLD (Cb) | NO INTERPOLATION | NO INTERPOLATION | UPWARD INTERPOLATION | NO INTERPOLATION | NO INTERPOLATION | NO INTERPOLATION | NO INTERPOLATION |

| BOTTOM | END | TOP |
|---|---|---|
| UPWARD TO RIGHT | | DOWNWARD TO RIGHT |

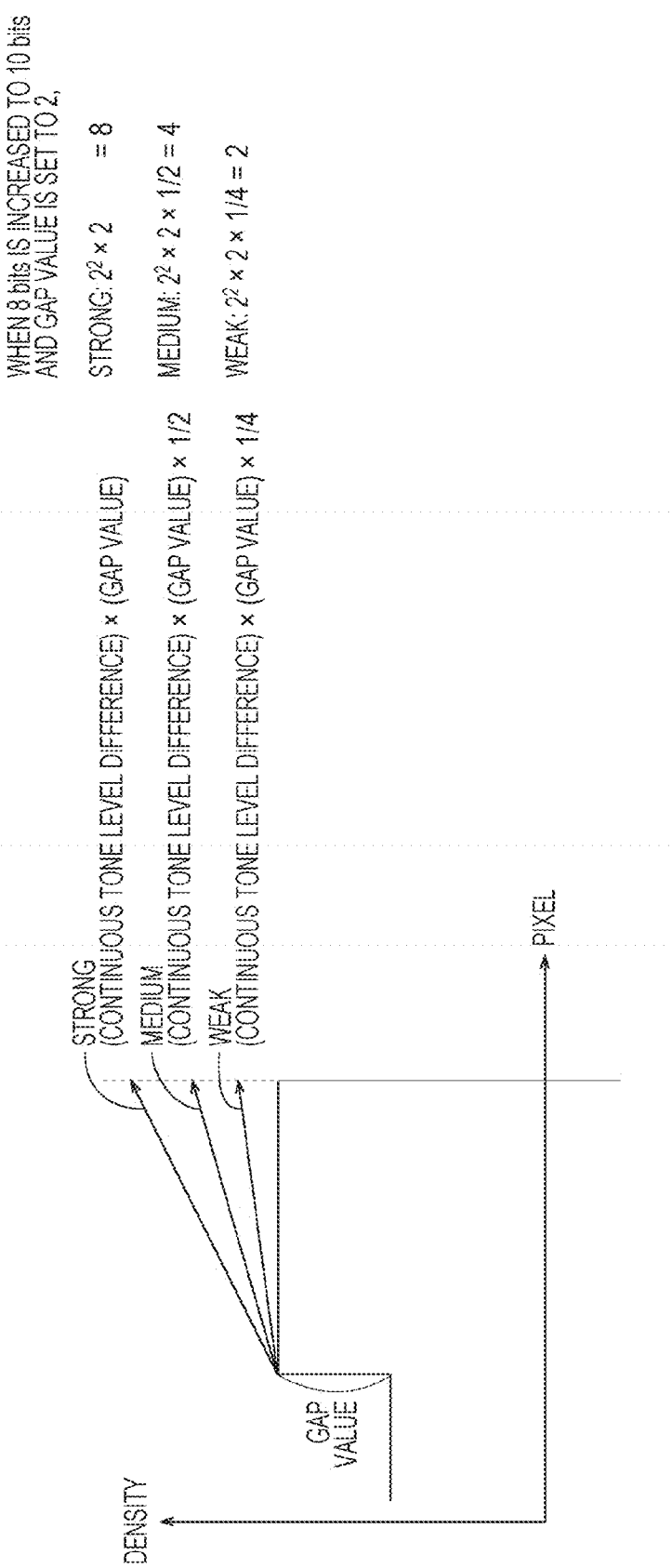

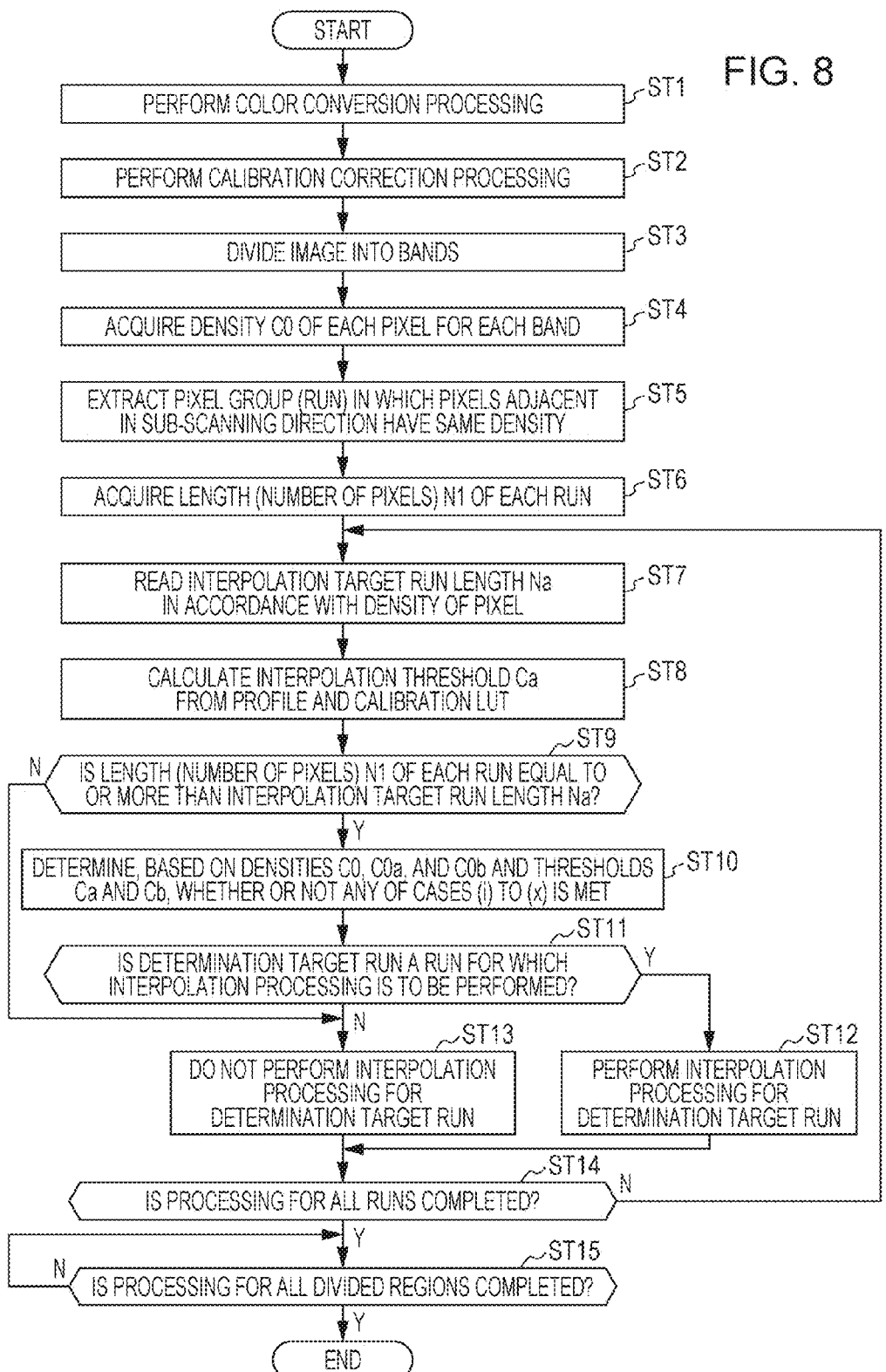

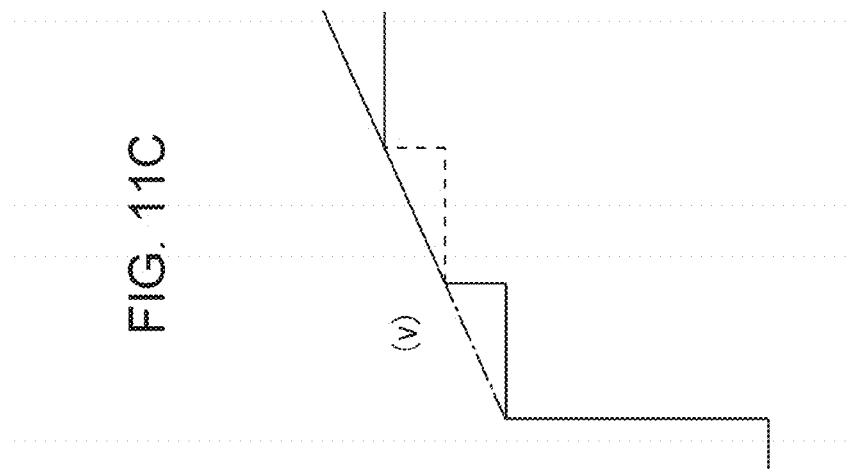
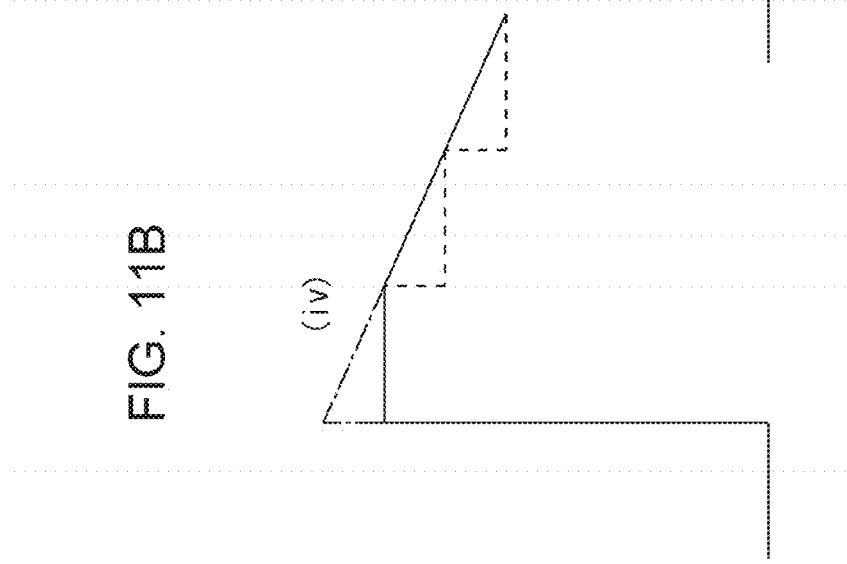
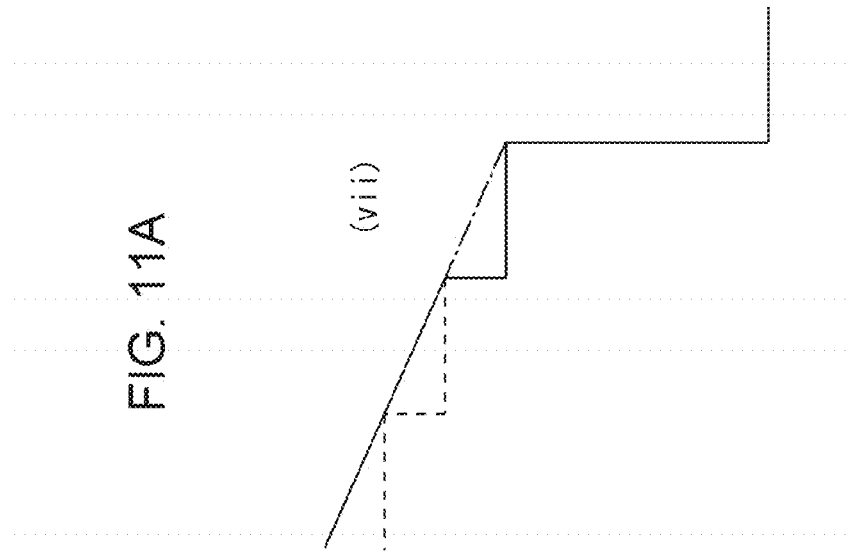

(viii)

(i)

(ii)

(vi)

IMAGE FORMING APPARATUS AND IMAGE PROCESSING METHOD

CROSS-REFERENCE TO RELATED APPLICATIONS

This application is based on and claims priority under 35 USC 119 from Japanese Patent Application No. 2016-169411 filed Aug. 31, 2016.

BACKGROUND

Technical Field

The present invention relates to an image forming apparatus and an image processing method.

SUMMARY

According to an aspect of the invention, there is provided an image forming apparatus including a determination unit and a continuous tone processing unit. The determination unit determines an end of a continuous tone image part in which a density changes continuously, the continuous tone image part being included in image information. The continuous tone processing unit performs, in a case where a number of levels of density of a print image in the image forming apparatus is larger than a number of levels of density of the image information, continuous tone processing for causing a density of a pixel group in which adjacent pixels have a same density to be changed continuously when increasing the number of levels of the density in an end portion of the continuous tone image part.

BRIEF DESCRIPTION OF THE DRAWINGS

Exemplary embodiments of the present invention will be described in detail based on the following figures, wherein:

FIG. 4 includes explanatory diagrams illustrating an example of an image process according to the first exemplary embodiment: part (A) of FIG. 4 is an explanatory diagram illustrating an example of a gradation image, Part (B) of FIG. 4 is an explanatory diagram of a case where color conversion processing is performed on the image data illustrated in part (A) of FIG. 4 using an example of color profile data, and part (C) of FIG. 4 is an explanatory diagram of a case where calibration processing is performed on the data obtained by the color conversion processing illustrated in part (B) of FIG. 4;

FIG. 5 is an explanatory diagram illustrating division of an image region in the image process according to the first exemplary embodiment;

FIG. 6 is an explanatory diagram of a list indicating density differences, thresholds, and presence or absence of continuous tone processing in the first exemplary embodiment;

FIG. 7 is an explanatory diagram of change rates in the first exemplary embodiment;

FIG. 8 is an explanatory diagram of a flowchart of the image process according to the first exemplary embodiment;

FIG. 9A is an explanatory diagram illustrating an example of the density of pixels of an original image, FIG. 9B is an explanatory diagram after color profile data and calibration LUT are applied to the image illustrated in FIG. 9A, and FIG. 9C is an explanatory diagram of a case where gradation processing is performed for the image illustrated in FIG. 9B;

FIG. 10A is an explanatory diagram of a continuous tone image before gradation processing is performed for case (v), FIG. 10B is an explanatory diagram of a continuous tone image after the gradation processing illustrated in FIG. 10A is performed, FIG. 10C is an explanatory diagram of an end portion of a continuous tone image before gradation processing is performed for case (iii), and FIG. 10D is an explanatory diagram of the end portion of the continuous tone image after the gradation processing illustrated in FIG. 10C is performed;

FIGS. 11A to 11C are explanatory diagrams of an image processing method: FIG. 11A is an explanatory diagram illustrating an example of a continuous tone image for case (vii), FIG. 11B is an explanatory diagram illustrating an example of a continuous tone image for case (iv), and FIG. 11C is an explanatory diagram illustrating an example of a continuous tone image for case (v);

FIG. 12A is an explanatory diagram illustrating an example of a continuous tone image for case (viii), FIG. 12B is an explanatory diagram illustrating an example of a continuous tone image for case (i), FIG. 12C is an explanatory diagram illustrating an example of a continuous tone image for case (ii), and FIG. 12D is an explanatory diagram illustrating an example of a continuous tone image for case (vi)

DETAILED DESCRIPTION

Specific exemplary embodiments of the present invention will be described below with reference to drawings. However, the present invention is not limited to the exemplary embodiments described below.

In drawings, for easier understanding of explanation provided below, a front-rear direction, a left-right direction, and a top-bottom direction will be defined as an X-axis direction, a Y-axis direction, and a Z-axis direction, respectively, and directions or sides indicated by arrows X, −X, Y, −Y, Z, and −Z will be defined as forward, backward, rightward, leftward, upward, and downward or a front side, a rear side, a right side, a left side, a top side, and a bottom side, respectively.

Furthermore, in drawings, "•" in a circle mark represents an arrow extending from the back side to front side of a sheet, and "x" in a circle mark represents an arrow extending from the front side to the back side.

In explanation provided with reference to drawings, for easier understanding, illustration of parts other than members necessary for explanation will be omitted in an appropriate manner.

First Exemplary Embodiment

Figure 1:
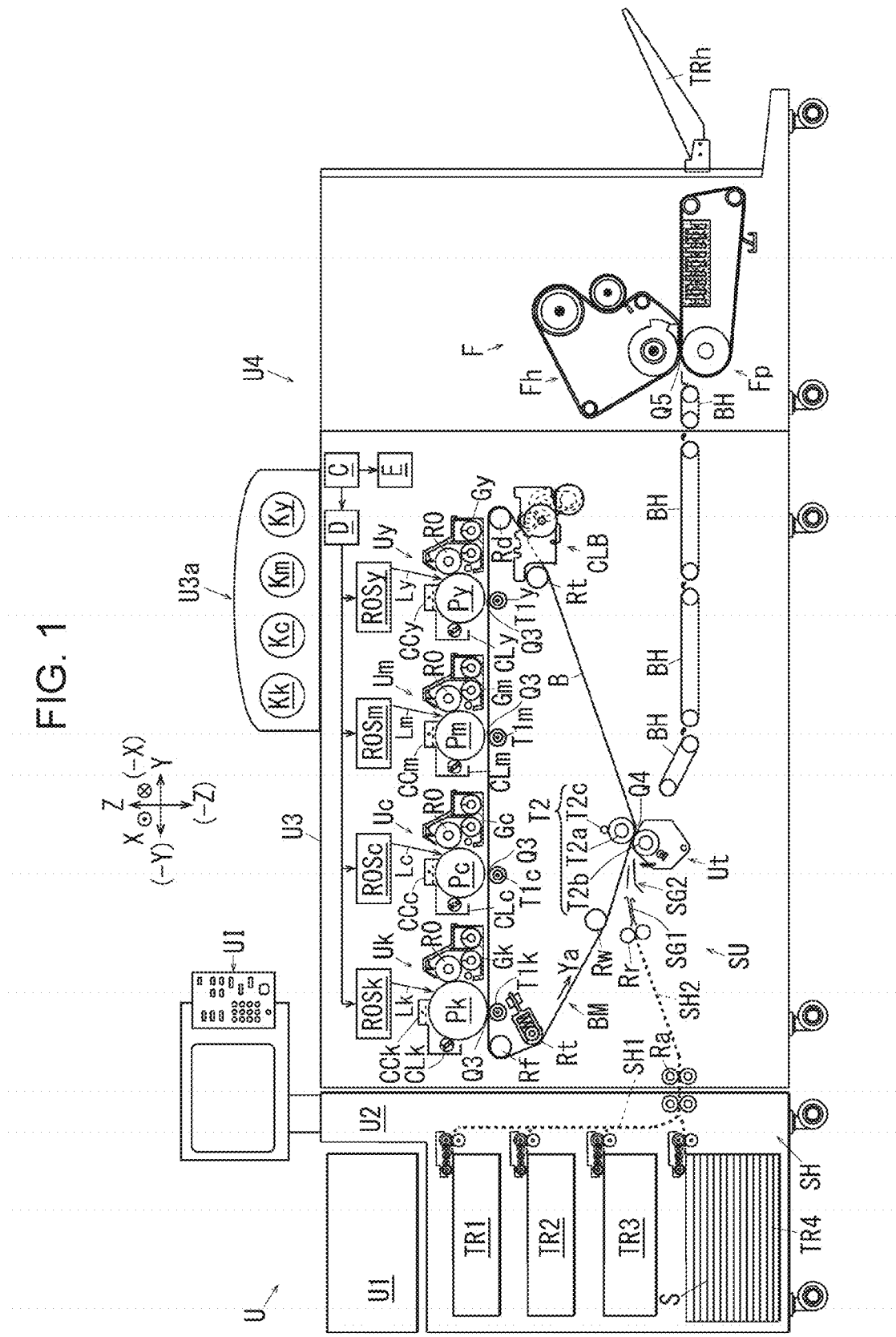
FIG. 1 is an explanatory diagram of the entire image forming apparatus according to a first exemplary embodiment.

FIG. 1 is an explanatory diagram of the entire image forming apparatus according to a first exemplary embodiment of the present invention.

Referring to FIG. 1, an image forming apparatus U includes an operation unit UI, a scanner device U1, which is an example of an image reading device, a sheet supply device U2, an image forming apparatus body U3, which is an example of an image recording device, and a sheet ejection unit U4.

The operation unit UI includes a power button, a copy start key, a number-of-copies set key, a numeric key, and the like, which are examples of an input unit, a display, and the like.

The scanner device U1 reads an original, which is not illustrated in FIG. 1, converts the original into image information, and inputs the image information to the image forming apparatus body U3.

The sheet supply device U2 includes plural sheet supply trays TR1 to TR4, which are an example of a sheet supply unit. In each of the sheet supply trays TR1 to TR4, a recording sheet S, which is an example of a medium, is accommodated. A sheet supply path SH1, which is an example of a medium transport path, extends from each of the sheet supply trays TR1 to TR4 to the image forming apparatus body U3.

Referring to FIG. 1, the image forming apparatus body U3 includes a controller C, a power supply circuit E that supplies power to each member of the image forming apparatus body U3 under the control of the controller C, and the like. The controller C receives image information of an original read with the scanner device U1 and image information transmitted from a personal computer, which is an example of an information transmitting apparatus, which is not illustrated in FIG. 1, connected to the image forming apparatus U.

The controller C processes the received image information into information for printing in yellow Y, magenta M, cyan C, and black K, and outputs the processed information to a laser driving circuit D, which is an example of a driving circuit for a latent image writing device. The laser driving circuit D outputs laser driving signals input from the controller C to latent image forming devices of individual colors: ROSy, ROSm, ROSc, and ROSk during a predetermined period.

Image holder units Uy, Um, Uc, and Uk for Y, M, C, and K are arranged below the latent image forming devices ROSy, ROSm, ROSc, and ROSk, respectively.

Referring to FIG. 1, the image holder unit Uk for black K includes a photoconductor drum Pk, which is an example of an image holder, a corotron CCk, which is an example of a charger, and a photoconductor cleaner CLk, which is an example of a cleaner for an image holder. The other image holder units Uy, Um, and Uc for yellow Y, magenta M, and cyan C also include photoconductor drums Py, Pm, and Pc, charging corotrons CCy, CCm, and CCc, and photoconductor cleaners CLy, CLm, and CLc, respectively.

In the first exemplary embodiment, the photoconductor drum Pk for black K, which is used more frequently and the surface of which is more worn, has a large diameter compared to the photoconductor drums Py, Pm, and Pc for the other colors, and achieves a high rotation speed and a longer life.

The photoconductor drums Py, Pm, Pc, and Pk are charged by the charging corotrons CCy, CCm, CCc, and CCk, respectively, in a uniform manner. Then, on the surfaces of the photoconductor drums Py to Pk, electrostatic latent images are formed by laser beams Ly, Lm, Lc, and Lk, which are examples of latent image writing light output from the latent image forming devices ROSy, ROSm, ROSc, and ROSk, respectively. The electrostatic latent images on the surfaces of the photoconductor drums Py, Pm, Pc, and Pk are developed into toner images, which are examples of visible images, by developer of corresponding colors yellow Y, magenta M, cyan C, and black K using developing rollers RO, which are examples of developing members, provided at developing devices Gy, Gm, Gc, and Gk, respectively.

The toner images on the surfaces of the photoconductor drums Py, Pm, Pc, and Pk are sequentially transferred in a superimposed manner onto an intermediate transfer belt B, which is an example of an intermediate transfer body and an example of an image holder, by first transfer rollers T1y, T1m, T1c, and T1k, respectively, which are examples of first transfer devices, in a first transfer region Q3, and a multi-color image, which is a so-called color image, is thus formed on the intermediate transfer belt B. The color image formed on the intermediate transfer belt B is transported to a second transfer region Q4.

In the case where only black image data is present, only the photoconductor drum Pk and developing device Gk for black K are used, and only a black toner image is thus formed.

After the first transfer is completed, residual toner remaining on the surfaces of the photoconductor drums Py, Pm, Pc, and Pk is cleaned by the photoconductor cleaners CLy, CLm, CLc, and CLk, respectively.

Toner image forming members Uy+Gy, Um+Gm, Uc+Gc, and Uk+Gk, which are examples of visible image forming units, are configured by the image holder units Uy, Um, Uc, and Uk and the developing devices Gy, Gm, Gc, and Gk, which are examples of developing devices, respectively.

A toner dispenser U3a, which is an example of a replenishing device, is arranged above the image forming apparatus body U3, and toner cartridges Ky, Km, Kc, and Kk, which are examples of housing containers for developer, are mounted at the toner dispenser U3a in an attachable and detachable manner. When toner is consumed at the developing devices Gy to Gk in accordance with image formation, toner is supplied from the toner cartridges Ky to Kk to the developing devices Gy to Gk, respectively.

The intermediate transfer belt B, which is arranged below the photoconductor drums Py to Pk, is stretched by an intermediate driving roller Rd, which is an example of a driving member for the intermediate transfer body, an intermediate tension roller Rt, which is an example of a tension providing member which provides tension to the intermediate transfer belt B, an intermediate steering roller Rw, which is an example of a first deflection correction member which corrects deflection and meandering of the intermediate transfer belt B, plural intermediate idler rollers Rf, which are examples of driven members for the intermediate transfer boy, and a backup roller T2a, which is an example of a member opposite the second transfer region. Then, the intermediate transfer belt B is supported in a direction of an arrow Ya in a rotationally movable manner by driving of the intermediate driving roller Rd.

A belt support roller Rd+Rt+Rw+Rf+T2a, which is an example of a support member for the intermediate transfer body in the first exemplary embodiment, is configured by the intermediate driving roller Rd, the intermediate tension roller Rt, the intermediate steering roller Rw, the intermediate idler rollers Rf, and the backup roller T2a. Furthermore, a belt module BM, which is an example of an intermediate transfer device, is configured by the intermediate transfer belt B, the belt support roller Rd+Rt+Rw+Rf+T2a, and the first transfer rollers T1y to T1k. The belt module BM in the first exemplary embodiment is configured by a unit which may implement attachment/detachment and replacement with respect to the image forming apparatus body U3.

The intermediate steering roller Rw in the first exemplary embodiment is configured by a rotation body including a rotating axis, and the rotating axis is tilted in a direction in which deflection is corrected in accordance with deflection in the width direction of the intermediate transfer belt B, so that deflection and meandering of the intermediate transfer belt B may be prevented. As described above, a steering roller Rw of a type for tilting the rotating axis in accordance with a detection result of a member for detecting deflection of a belt, such as an optical sensor or a member which is in contact with an end of the belt, and correcting the deflection, that is, a so-called active steering type, is a known technology, and various known configurations described in, for example, Japanese Unexamined Patent Application Publication Nos. 2009-86463, 2010-231112, and the like may be adopted. Therefore, detailed explanation will be omitted.

Below the backup roller T2a, a second transfer unit Ut, which is an example of a transfer transport device, is arranged. The second transfer unit Ut includes a second transfer roller T2b, which is an example of a transfer member. The second transfer roller T2b is arranged facing the backup roller T2a. The second transfer region Q4 is configured by a region in which the second transfer roller T2b faces the intermediate transfer belt B. Furthermore, a contact roller T2c, which is an example of a contact member for voltage application, is in contact with the backup roller T2a. A second transfer device T2 is configured by the rollers T2a to T2c.

Second transfer voltage which has the same polarity as the charge polarity of toner is applied to the contact roller T2c from the power supply circuit E controlled by the controller C during a predetermined period.

A sheet transport path SH2 is arranged below the belt module BM. The recording sheet S which is supplied through the sheet supply path SH1 of the sheet supply device U2 is transported to the sheet transport path SH2 by a transport roller Ra, which is an example of a transport member. The recording sheet S at the sheet transport path SH2 is sent by a resist roller Rr, which is an example of a sending member, at the time when a toner image is transported to the second transfer region Q4, and is transported to the second transfer region Q4 by being guided by sheet guides SG1 and SG2, which are examples of a medium guide member.

The toner image on the intermediate transfer belt B is transferred to the recording sheet S by the second transfer device T2 when passing through the second transfer region Q4. For a color image, toner images transferred to the surface of the intermediate transfer belt B in a superimposed manner by first transfer are collectively transferred to the recording sheet S by second transfer.

The intermediate transfer belt B on which second transfer has been performed is cleaned by a belt cleaner CLB, which is an example of a cleaning device for the intermediate transfer body. The second transfer roller T2b is supported in a manner such that the second transfer roller T2b may be separated from or in contact with the intermediate transfer belt B.

A transfer device T1+B+T2+CLB which transfers images on the surfaces of the photoconductor drums Py to Pk to the recording sheet S is configured by the first transfer rollers T1y, T1m, T1c, and T1k, the intermediate transfer belt B, the second transfer device T2, the belt cleaner CLB, and the like.

The recording sheet S to which the toner image is transferred by second transfer is sent to a medium transport belt BH, which is an example of a transport member. The medium transport belt BH allows the recording sheet S to be transferred to a fixing device F. The fixing device F includes a heating member Fh, which is an example of a heating and fixing member, and a pressurizing member Fp, which is an example of a pressurizing and fixing member, and a fixing region Q5 is formed by a region in which the heating member Fh and the pressurizing member Fp are in contact with each other.

The toner image on the recording sheet S is heated and fixed by the fixing device F when passing through the fixing region Q5. The recording sheet S to which the toner image is fixed by the fixing device F is ejected to an ejection tray TRh, which is an example of an ejection unit.

A sheet transport path SH is configured by the sheet supply path SH1 and the sheet transport path SH2. Furthermore, a sheet transport device SU is configured by the sheet transport path SH, the transport roller Ra, the resist roller Rr, the sheet guide SG1, the sheet guide SG2, the medium transport belt BH, and the like.

Explanation for Controller in First Exemplary Embodiment

Figure 2:
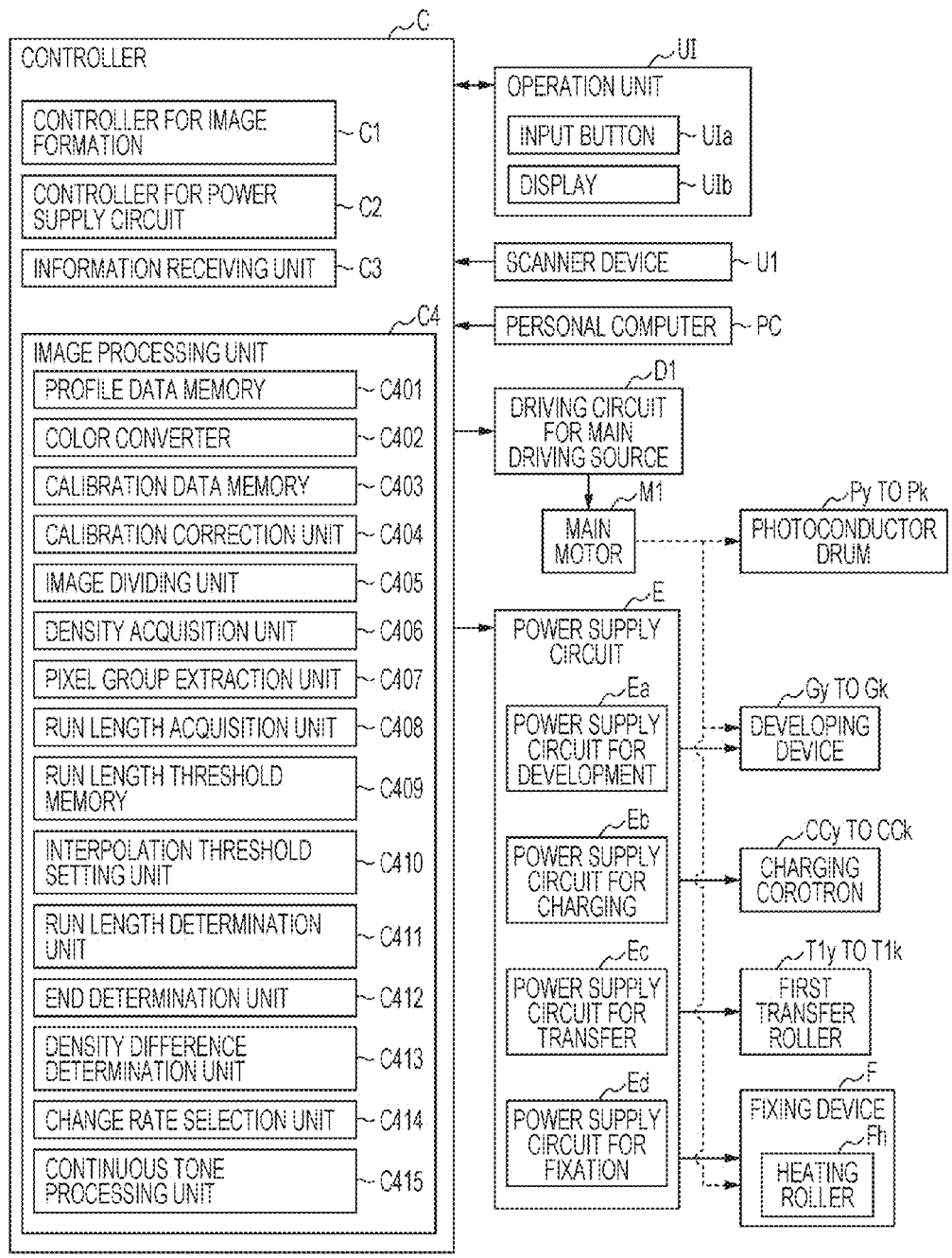
FIG. 2 is a block diagram illustrating functions of a controller of the image forming apparatus according to the first exemplary embodiment.

FIG. 2 is a block diagram illustrating functions of the controller C of the image forming apparatus U according to the first exemplary embodiment.

Referring to FIG. 2, the controller C of the image forming apparatus U includes an input/output interface I/O which performs input, output, and the like of signals to and from an outside of the image forming apparatus U. The controller C also includes a read only memory (ROM) which stores a program, information, and the like for execution of necessary processing. The controller C further includes a random access memory (RAM) which temporarily stores necessary data. The controller C also includes a central processing unit (CPU) which performs processing in accordance with a program stored in the ROM or the like. Accordingly, the controller C in the first exemplary embodiment includes a small-size information processing device, that is, a so-called microcomputer. Therefore, the controller C may implement various functions by executing a program stored in the ROM or the like.

Signal Output Element Connected to Controller

Output signals from signal output elements such as the operation unit UI and the scanner device U1 are input to the controller C.

The operation unit UI includes input buttons UIa such as a power button, a copy start key, a number-of-copies set key, and a numeric key, which are examples of an input member. The operation unit UI also includes a display UIb, which is an example of a display member.

Elements Connected to and Controlled by Controller

The controller C is connected to a driving circuit D1 for a main driving source, the power supply circuit E, and other control elements, which are not illustrated in FIG. 2. The controller C outputs control signals to the driving circuit D1, the power supply circuit E, and the like.

D1: Driving Circuit for Main Driving Source

The driving circuit D1 for a main driving source is an example of a driving source for an image holder, and rotates and drives the photoconductor drums Py to Pk, the intermediate transfer belt B, and the like via a main motor M1, which is an example of a main driving source.

E: Power Supply Circuit

The power supply circuit E includes a power supply circuit Ea for development, a power supply circuit Eb for charging, a power supply circuit Ec for transfer, a power supply circuit Ed for fixation, and the like.

Ea: Power Supply Circuit for Development

The power supply circuit Ea for development applies developing voltage to the developing rollers of the developing devices Gy to Gk.

Eb: Power Supply Circuit for Charging

The power supply circuit Eb for charging applies to the charging corotrons CCy to CCk charging voltage for charging the surfaces of the photoconductor drums Py to Pk, respectively.

Ec: Power Supply Circuit for Transfer

The power supply circuit Ec for transfer applies transfer voltage to the first transfer rollers T1y to T1k and the backup roller T2a.

Ed: Power Supply Circuit for Fixation

The power supply circuit Ed for fixation supplies electric power to a built-in heater of the heating member Fh of the fixing device F.

Function of Controller

The controller C includes a function for executing processing in accordance with an input signal from the signal output element and outputting a control signal to the control element. That is, the controller C includes functions described below.

C1: Controller for Image Formation

A controller C1 for image formation controls, in accordance with image information input from the scanner device U1 or a personal computer, driving of each member of the image forming apparatus body U3, a period during which each voltage is applied, and the like, and controls execution, termination, interruption of a job, which is an image forming operation.

C2: Controller for Power Supply Circuit

A controller C2 for a power supply circuit controls each of the power supply circuits Ea to Ed, and controls voltage to be applied to each member and electric power to be supplied to each member.

Figure 3:
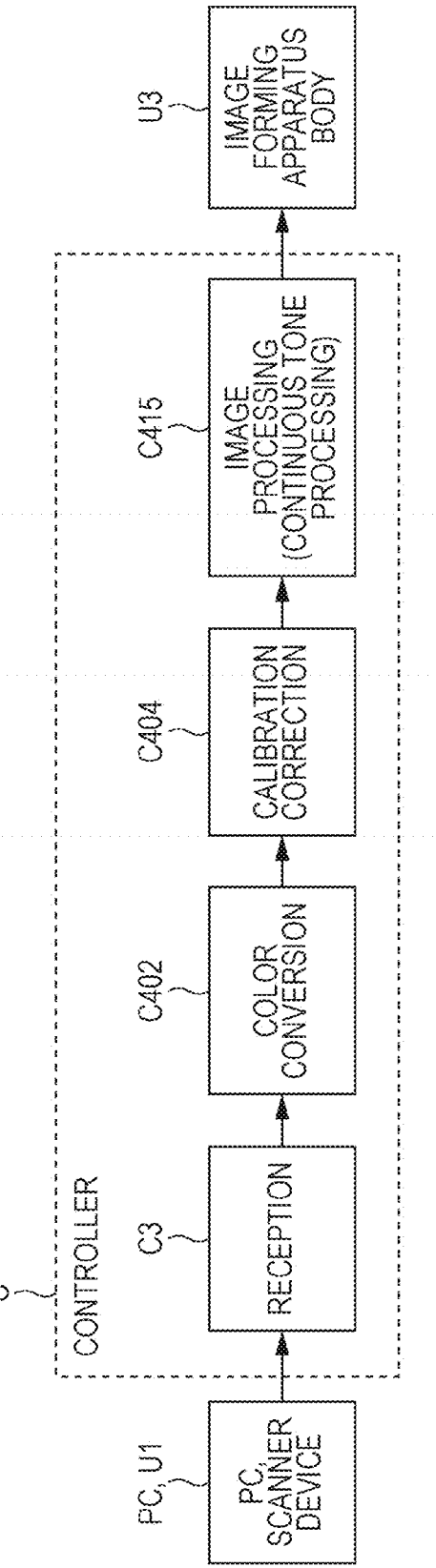
FIG. 3 is an explanatory diagram schematically illustrating the flow of a process in the controller of the image forming apparatus according to the first exemplary embodiment.

FIG. 3 is an explanatory diagram schematically illustrating the flow of a process in the controller C of the image forming apparatus U according to the first exemplary embodiment.

C3: Information Receiving Unit

An information receiving unit C3 receives image information transmitted from the scanner device U1 and a personal computer.

C4: Image Processing Unit

Referring to FIG. 2, an image processing unit C4, which is an example of an image processing program, processes received image information into print information to be printed by the image forming apparatus body U3. For example, in the case where the image forming apparatus body U3 may perform printing with a continuous tone level difference of 10 bits (1024 continuous tones) and received image information has a continuous tone level difference of 8 bits, that is, 256 continuous tones, the image processing unit C4 in the first exemplary embodiment performs an image process for increasing the continuous tone level difference by 2 bits (=level difference of 4) to 10 bits. The image processing unit C4 in the first exemplary embodiment includes units C401 to C415, which will be described below.

FIG. 4 includes explanatory diagrams illustrating an example of an image process according to the first exemplary embodiment. Part (A) of FIG. 4 is an explanatory diagram illustrating an example of a gradation image, part (B) of FIG. 4 is an explanatory diagram of a case where color conversion processing is performed on the image data illustrated in part (A) of FIG. 4 using an example of color profile data, and part (C) of FIG. 4 is an explanatory diagram of a case where calibration processing is performed on the data obtained by the color conversion processing illustrated in part (B) of FIG. 4.

C401: Profile Data Memory

A profile data memory C401 stores color profile data, which is an example of conversion information. Referring to FIG. 4, for example, color profile data whose density is converted from 100% to 100%, from 99% to 98%, from 98% to 97%, from 97% to 96%, and so on in the case where color profile data is applied to an image whose density changes in the order of 100%, 99%, 98%, 97%, and so on as illustrated in part (A) of FIG. 4, is stored. In the first exemplary embodiment, a CMYK profile Japan Color 2011 is used as an example of color profile data. However, color profile data is not limited to this. Any color profile data which has been used in Japan or other countries or color profile data which is manually set by a user may be used.

C402: Color Convertor

A color converter C402, which is an example of a converter, performs color conversion processing for received image information, based on color profile data stored in the profile data memory C401.

C403: Calibration Data Memory

A calibration data memory C403, which is an example of memory for correction information, stores a calibration look up table (LUT), which is an example of density correction information. Referring to FIG. 4, for example, a calibration LUT which converts density from 100% to 100%, from 99% to 98%, from 98% to 95%, from 97% to 94%, from 96% to 93%, and so on in the case where color profile data is applied to an image whose density changes in the order of 100%, 99%, 98%, 97%, and so on, is stored.

A calibration LUT is created when the image forming apparatus U performs an operation for creating a calibration LUT, separately from an image forming operation. Specifically, an image set in advance for calibration is printed, the printed image for calibration is read with the scanner device U1, and a calibration LUT is created based on the difference between the set density set in advance for the image for calibration and the actual density of the actually printed image for calibration. Such a process for creating a calibration LUT is well known, and therefore, detailed explanation for the process will be omitted.

In the first exemplary embodiment, color profile data is set according to the type of the image forming apparatus U, and a calibration LUT is set for each image forming apparatus U. Therefore, an image process using color profile data is performed according to the specifications and settings for each apparatus type, and an image process using the calibration LUT is performed according to an individual difference.

C404: Calibration Correction Unit

A calibration correction unit C404, which is an example of a correction unit, corrects print information obtained by conversion by the color converter C402, based on the calibration LUT. Therefore, in an example illustrated in FIG. 4, when color profile data is applied to an image whose density changes in the order of 100%, 99%, 98%, 97%, and so on as illustrated in part (A) of FIG. 4 and then the calibration LUT is applied, a pixel of 100% is converted in the order of 100%, 100%, and 100%, a pixel of 99% is converted in the order of 99%, 98%, and 95%, a pixel of 98% is converted in the order of 98%, 97%, and 94%, a pixel of 97% is converted in the order of 97%, 96%, and 93%, and so on.

FIG. 5 is an explanatory diagram regarding division of image regions in the image process according to the first exemplary embodiment.

C405: Image Dividing Unit

An image dividing unit C405, which is an example of a dividing unit, divides a region of an image to be printed into plural regions along a predetermined direction. Referring to FIG. 5, the image dividing unit C405 in the first exemplary embodiment divides an image region A1 of an image 101 to be printed into plural regions A2 along a sub-scanning direction, which is an example of a predetermined direction. In the first exemplary embodiment, the speed of an image process is increased by concurrently performing processing for the plural divided regions A2 obtained by dividing the image region A1. However, in the case where it is difficult to perform concurrent processing because of the processing ability of a processor or the entire processing speed decreases by concurrent processing, an image process may be performed without division. Furthermore, the direction of division is not necessarily the sub-scanning direction. An image region may be divided in a desired manner, such as division in a main-scanning direction or division in the sub-scanning direction and the main-scanning direction in a grid manner. Furthermore, in the first exemplary embodiment, a configuration in which the image region A1 is divided after color conversion processing and calibration correction processing are performed is described as an example. However, the present invention is not limited to this. For example, division of the image region A1 may be performed before the color conversion processing and the calibration correction processing are performed and the color conversion processing and the like may be performed for each of the divided regions A2.

C406: Density Acquisition Unit

A density acquisition unit C406 acquires the density C0 of each pixel in the image 101 to be printed.

C407: Pixel Group Extraction Unit

A pixel group extraction unit C407 extracts a run, which is an example of a pixel group in which plural pixels having the same density C0 are adjacent to each other. In the first exemplary embodiment, a run, which is a pixel group in which plural pixels having the same density are adjacent to each other in the sub-scanning direction, is extracted for each divided region A2.

C408: Run Length Acquisition Unit

A run length acquisition unit C408, which is an example of a pixel group length acquisition unit, acquires the length of a run extracted by the pixel group extraction unit C407, that is, the number of pixels (run length) N1 of a pixel group. The run length acquisition unit C408 in the first exemplary embodiment acquires the run length N1 for each run.

C409: Run Length Threshold Memory

A run length threshold memory C409, which is an example of a pixel group threshold memory, stores an interpolation target run length Na, which is an example of a run length threshold, based on the density C0 of each run. In the first exemplary embodiment, setting information in which the interpolation target run length Na increases as the density C0 increases, is stored. For example, setting information in which the interpolation target run length Na is set to 40 pixels when the density C0 is between 0% and 10%, the interpolation target run length Na is set to 80 pixels when the density C0 is between 10% and 20%, the interpolation target run length Na is set to 120 pixels when the density C0 is between 20% and 30%, and the interpolation target run length Na is ∞% when the density C0 is higher than 30%, is stored. The interpolation target run length Na is a threshold used for performing continuous tone processing (continuous tone level difference interpolation processing) for causing the density to be changed continuously by increasing the continuous tone level difference in the run and making a determination that continuous tone processing is not to be performed in the case where the run length N1 does not reach the interpolation target run length Na. Furthermore, in the first exemplary embodiment, when the density C0 is higher than 30%, the interpolation target run length Na is set to ∞, and continuous tone processing is not performed even if the run length N1 is very large. A specific value of the interpolation target run length Na is not limited to the value illustrated above. Any change may be made to the interpolation target run length Na according to the design, specifications, manual setting by a user, or the like.

C410: Interpolation Threshold Setting Unit

An interpolation threshold setting unit C410, which is an example of a density difference threshold setting unit, sets an interpolation threshold (interpolation target reference Gap value) Ca, which is an example of a density difference threshold. The interpolation threshold setting unit C410 in the first exemplary embodiment sets, based on color profile data and the calibration LUT, the interpolation threshold Ca to be used for determining whether or not to perform continuous tone processing (continuous tone level difference interpolation processing). In the first exemplary embodiment, in the case where a threshold to be used for determining whether or not to perform interpolation processing in an original image is set to 1, the interpolation threshold Ca is set based on equation (1).

$$Ca=\text{Max}[\text{CalibLUT}(\text{Profile}(C0))-\text{CalibLUT}(\text{Profile}(C0-1))] \quad (1),$$

wherein "Profile (x)" represents a function to be used for calculating density after color conversion processing for density x is performed using color profile data, and "CalibLUT (y)" represents a function to be used for calculating density after correction processing for density y is performed using the calibration LUT. Therefore, in the case where the density C0 is 100, Profile (100) is set to 100, CalibLUT (Profile (100)) is set to 100, and CalibLUT (Profile (C1−1))=CalibLUT (Profile (99))=CalibLUT (98)=95. Then, calculation of CalibLUT (Profile (C0))−CalibLUT (Profile (C0−1)) is performed for each density C0 (1 to 100), and the maximum value (Max) is set as the interpolation threshold Ca.

In the case where a threshold to be used for determining whether or not to perform interpolation processing in an original image is m, an item of CalibLUT (Profile (C0−1)) in equation 1 may be set to CalibLUT (Profile (C0−m)).

C411: Run Length Determination Unit

A run length determination unit C411 determines whether or not the run length N1 of each run reaches the interpolation target run length Na. The run length determination unit C411 in the first exemplary embodiment determines that continuous tone processing is to be performed in the case where the run length N1 reaches the interpolation target run length Na. The interpolation target run length Na which corresponds to the density C0 of each run stored in the run length threshold memory C409 is used.

C412: End Determination Unit

An end determination unit C412 determines whether or not each run includes a pixel at an end of a divided region A2, that is, whether or not each run extends from an end of a divided region A2.

C413: Density Difference Determination Unit

A density difference determination unit C413 determines whether or not the density difference between the density of a pixel adjacent to a run and the density C0 of the run reaches the interpolation threshold Ca. The density difference determination unit C413 in the first exemplary embodiment determines, for each run, regarding a density C0a of a pixel adjacent to the run on a downstream side in the sub-scanning direction (medium transport direction) and a density C0b of a pixel adjacent to the run on an upstream side in the sub-scanning direction, whether each of a density difference C0a−C0 and a density difference C0b−C0 is greater than the interpolation threshold Ca and a predetermined edge threshold Cb. The edge threshold Cb is a threshold to be used for determining an end of a continuous tone image part 102. In the case where a background part (blank part), a solid image, a natural image, or the like is adjacent to the continuous tone image part 102, the edge threshold Cb is stored in advance for determining an end of the continuous tone image part 102, based on the density difference between the adjacent image and an end of the continuous tone image part 102. In the first exemplary embodiment, the interpolation threshold Ca is set to be smaller than the edge threshold Cb.

Furthermore, the density difference determination unit C413 in the first exemplary embodiment determines, in the case where a run extends from an end of a divided region A2, whether or not, regarding the density C0a or C0b of a pixel opposite the end, the density difference C0a−C0 or C0b−C0 is greater than the interpolation threshold Ca.

In the explanation provided below, for easier understanding, a pixel on a downstream side is represented by "right" side, and a pixel on an upstream side is represented by "left" side. Furthermore, "density difference" may be represented by "level difference".

FIG. 6 is an explanatory diagram of a list indicating density differences, thresholds, and presence or absence of continuous tone processing in the first exemplary embodiment.

In the first exemplary embodiment, a determination as to whether or not to perform continuous tone processing is performed, as illustrated in FIG. 6, for a run which is determined in the determination of the run length that continuous tone processing is to be performed. Specifically, it is determined that continuous tone processing is to be performed in the cases described below.

(i) In the case where the density difference C0a−C0 is greater than 0 (right level difference is positive), the density difference C0b−C0 is greater than 0 (left level difference is positive), |C0a−C0| is smaller than Ca, and |C0b−C0| is greater than Cb, it is determined that a determination target run has a density "bottom" with respect to the density of pixels on the left and right sides and (upward to the right) continuous tone level difference interpolation processing for increasing the density from the left end toward the right end of the run is to be performed. That is, it is determined that the determination target run is a run for which processing for increasing the density from the density C0 of the run toward the density C0a of a pixel on the right side is to be performed.

(ii) In the case where the density difference C0a−C0 is greater than 0 (right level difference is positive), the density difference C0b−C0 is greater than 0 (left level difference is positive), |C0a−C0| is greater than Cb, and |C0b−C0| is smaller than Ca, it is determined that a determination target run has a density "bottom" with respect to the density of pixels on the left and right sides and (downward to the right) continuous tone level difference interpolation processing for reducing the density from the left end toward the right end of the run is to be performed. That is, it is determined that the determination target run is a run for which processing for reducing the density from the density C0b of a pixel on the left side toward the density C0 of the determination target run is to be performed.

(iii) In the case where the density difference C0a−C0 is smaller than 0 (right level difference is negative), the density difference C0b−C0 is smaller than 0 (left level difference is negative), |C0a−C0| is greater than Cb, and |C0b−C0| is smaller than Ca, it is determined that a determination target run has a density "top" with respect to the density of pixels on the left and right sides and (upward to the right) continuous tone level difference processing for increasing the density from the left end toward the right end of the run is to be performed. Therefore, it is determined that the determination target run is a run for which processing for increasing the density from the density C0 of the run toward right in accordance with a change rate, which will be described later, is to be performed. Thus, unlike the cases (i) and (ii), the density of the right end is predicted and estimated based on the density C0 of the left end in accordance with the change rate, and prediction interpolation processing is to be performed.

(iv) In the case where the density difference C0a−C0 is smaller than 0 (right level difference is negative), the density difference C0b−C0 is smaller than 0 (left level difference is negative), |C0a−C0| is smaller than Ca, and |C0b−C0| is greater than Cb, it is determined that a determination target run has a density "top" with respect to the density of pixels on the left and right sides and (downward to the right) continuous tone level difference interpolation processing for reducing the density from the left end toward the right end of the run is to be performed. That is, it is determined that the determination target run is a run for which prediction interpolation processing for increasing the density from the density C0 of the determination target run on the right side toward the left side in accordance with a change rate is to be performed.

(v) In the case where the density difference C0a−C0 is greater than 0 (right level difference is positive), the density difference C0b−C0 is smaller than 0 (left level difference is negative), and |C0a−C0| is smaller than Ca, it is determined that density increases from a left-adjacent pixel to a right-adjacent pixel across a run and (upward to the right) continuous tone level difference interpolation processing for increasing density from left toward right of a run is to be performed for a determination target run. That is, it is determined that the determination target run is a run for which processing for increasing density from the density C0 of the run toward the density C0a of the right-adjacent pixel is to be performed.

(vi) In the case where the density difference C0a−C0 is greater than 0 (right level difference is positive), the density difference C0b−C0 is smaller than 0 (left level difference is negative), |C0a−C0| is greater than Ca, and |C0b−C0| is smaller than Ca, it is determined that a determination target run is at the right end of the continuous tone image part 102, on the right side of which a high-density image such as a solid image is adjacent. Therefore, it is determined that (upward to the right) continuous tone level difference prediction interpolation processing for increasing density from left toward right of a run is to be performed for the determination target run. That is, it is determined that the determination target run is a run for which processing for increasing density from the density C0 of the run toward the right side in accordance with a change rate is to be performed.

(vii) In the case where the density difference C0a−C0 is smaller than 0 (right level difference is negative), the density difference C0b−C0 is greater than 0 (left level difference is positive), and |C0b−C0| is smaller than Ca, it is determined that density decreases from a left-adjacent pixel toward a right-adjacent pixel across a run. Therefore, it is determined that (downward to the right) continuous tone level difference interpolation processing for reducing density from left toward right of a run is to be performed for a determination target run. That is, it is determined that the determination target run is a run for which processing for reducing density from the density C0b of a left-adjacent pixel toward the density C0 of the run is to be performed.

(viii) In the case where the density difference C0a−C0 is smaller than 0 (right level difference is negative), the density difference C0b−C0 is greater than 0 (left level difference is positive), |C0a−C0| is smaller than Ca, and |C0b−C0| is greater than Ca, it is determined that a determination target run is at the left end of the continuous tone image part 102, on the left side of which a high-density image such as a solid image is adjacent. Therefore, it is determined that (downward to the right) continuous tone level difference prediction interpolation processing for reducing density from left toward right of a run is to be performed for the determination target run. That is, it is determined that the determination target run is a run for which processing for increasing density from the density C0 of the run toward left in accordance with a change rate is to be performed.

(ix) In the case where a left end is an end of a divided region A2 and |C0a−C0| is smaller than Ca, it is determined that a determination target run is on an end of the divided region A2 and is a run for which continuous tone level difference prediction interpolation processing is to be performed. In the case where C0a−C0 is greater than 0 (right level difference is positive), it is determined that density increases (upward to the right) from left toward right of the run and the determination target run is a run for which prediction interpolation processing for reducing density toward left in accordance with the density C0a of a right-adjacent pixel and a change rate. Furthermore, in the case where the density difference C0a−C0 is smaller than 0 (right level difference is negative), it is determined that density decreases (downward to the right) from left toward right of the run and the determination target run is a run for which prediction interpolation processing for reducing density toward right in accordance with the density C0b of a left-adjacent pixel and a change rate is to be performed.

(x) In the case where a right end is an end of a divided region A2 and |C0b−C0| is smaller than Ca, it is determined that a determination target run is on an end of the divided region A2 and is a run for which continuous tone level difference prediction interpolation processing is to be performed. In the case where the density difference C0b−C0 is greater than 0 (left level difference is positive), it is determined that density decreases (downward to the right) from left toward right of the run and the determination target run is a run for which prediction interpolation processing for reducing density toward right in accordance with the density C0b of a left-adjacent pixel and a change rate is to be performed. Furthermore, in the case where the density difference C0b−C0 is smaller than 0 (left level difference is negative), it is determined that density increases (upward to the right) from left toward right of the run and the determination target run is a run for which prediction interpolation processing for increasing density toward right in accordance with the density C0 of the run and a change rate is to be performed.

FIG. 7 is an explanatory diagram of change rates in the first exemplary embodiment.

C414: Change Rate Selection Unit

A change rate selection unit C414 selects a density change in continuous tone processing from plural predetermined change rates. In the first exemplary embodiment, three types of change rates: strong change; medium change; and weak change, are set in advance. In the first exemplary embodiment, a change rate is used for a case where continuous tone processing is performed for a run at an end portion of the continuous tone image part 102 or a run extending from an end of a divided region A2. In the first exemplary embodiment, referring to FIG. 7, as a storage change, a change rate in which (the number of changing continuous tone level differences)×(a density difference from an adjacent pixel inside the continuous tone image part 102: Gap value) is equal to the density at an end of a run, is set. As a medium change, a change rate in which (the number of changing continuous tone level differences)×(Gap value)×½ is equal to the density at an end of a run, is set. Furthermore, as a medium change, a change rate in which (the number of changing continuous tone level differences)×(Gap value)×¼ is equal to the density at an end of a run, is set. In the first exemplary embodiment, an initial value is set to a weak change, and a user may select and set a change rate by input through the operation unit UI. A specific calculation value for a change rate is not limited to the example described above. Any change may be made in accordance with design, specifications, and the lie. Furthermore, it is desirable that a change rate may be selected. However, a change rate may be fixed to a specific change rate.

C415: Continuous Tone Processing Unit

A continuous tone processing unit C415 performs continuous tone processing (gradation processing, continuous tone level difference interpolation processing) for causing the density of the continuous tone image part 102 of the image 101 to be printed to be changed continuously. The continuous tone processing unit C415 in the first exemplary embodiment performs, based on determination results of the run length determination unit C411 and the density difference determination unit C413, continuous tone level difference interpolation processing (continuous tone processing) for causing density in a run to be changed continuously in the case where the number of continuous tone levels (continuous tone level difference) increases. Therefore, in the first exemplary embodiment, based on the interpolation threshold Ca, the edge threshold Cb, the density differences C0–Ca and C0–Cb, continuous tone processing is performed. The continuous tone processing unit C415 in the first exemplary embodiment performs interpolation processing or prediction interpolation processing in accordance with determination results (i) to (x) of the density difference determination unit C413. For example, in the case (i), setting may be performed such that density increases by (C0a−C0)/(continuous tone level difference) as the pixel proceeds by {N1/(continuous tone level difference)}.

In the first exemplary embodiment, in the case where the run length N1 reaches the interpolation target run length Na, continuous tone processing is performed, and the interpolation target run length Na is changed in accordance with the density C0 of a pixel. In the first exemplary embodiment, in the case where the density C0 of a pixel reaches 30%, which is a predetermined density, continuous tone processing is not performed. Furthermore, in the case where the run length N1 reaches the interpolation target run length Na and the density C0 of a pixel does not reach 30%, continuous tone processing is performed.

Explanation for Flowchart in First Exemplary Embodiment

Next, the flow of control in the image forming apparatus U according to the first exemplary embodiment will be explained with reference to a so-called flowchart.

Explanator for Flowchart of Image Process

FIG. 8 is an explanatory diagram of a flowchart of an image process according to the first exemplary embodiment.

Processing of individual steps ST in the flowchart of FIG. 8 is performed in accordance with a program stored in the controller C of the image forming apparatus U. Furthermore, this process is performed concurrently with other various processes of the image forming apparatus U.

The flowchart illustrated in FIG. 8 starts when the image forming apparatus U receives image information, that is, receives image information from a personal computer PC or image information read with the scanner device U1.

In ST1 of FIG. 8, color conversion processing using a color profile is performed. Then, the process proceeds to ST2.

In ST2, calibration correction processing using a calibration LUT is performed. Then, the process proceeds to ST3.

In ST3, the image region A1 is divided into band-like divided regions A2. Then, the process proceeds to ST4.

In ST4, in each of the divided regions A2, the density C0 of each pixel is acquired. Then, the process proceeds to ST5.

In ST5, a pixel group: run, in which pixels adjacent to each other in the sub-scanning direction have the same density C0, is extracted. Then, the process proceeds to ST6.

In ST6, the run length N1 of each run is acquired. Then, the process proceeds to ST7.

In ST7, an interpolation target run length Na corresponding to the density C0 of a determination target run is read. Then, the process proceeds to ST8.

In ST8, an interpolation threshold Ca is calculated based on the color profile data and the calibration LUT. Then, the process proceeds to ST9.

In ST9, it is determined whether or not the run length N1 is equal to or more than the interpolation target run length Na. In the case where the determination result is yes (Y), the process proceeds to ST10. In the case where the determination result is no (N), the process proceeds to ST13.

In ST10, based on the density C0 of the determination target run, the densities C0a and C0b of adjacent pixels, and the thresholds Ca and Cb, it is determined whether or not any of the cases (i) to (x) is met. Then, the process proceeds to ST11.

In ST11, it is determined whether or not the determination target run is a run for which interpolation processing is to be performed, that is, whether or not any of the cases (i) to (x) is met. In the case where the determination result is yes (Y), the process proceeds to ST12. In the case where the determination result is no (N), the process proceeds to ST13.

In ST12, continuous tone level difference interpolation processing is performed for the determination target run. Then, the process proceeds to ST14.

In ST13, continuous tone level difference interpolation processing is not performed for the determination target run. Then, the process proceeds to ST14.

In ST14, it is determined whether or not processing for all the runs is completed. In the case where the determination result is yes (Y), the process proceeds to ST15. In the case where the determination result is no (N), the process returns to ST7.

In ST15, it is determined whether or not processing for all the divided regions A2, for which concurrent processing is being performed, is completed. In the case where the determination result is no (N), the processing of ST15 is repeated. In the case where the determination result is yes (Y), processed print information is output to the image forming apparatus body U3, and the process illustrated in FIG. 8 ends.

Operation of First Exemplary Embodiment

In the case where the image forming apparatus U according to the first exemplary embodiment including the above configuration receives image information transmitted from an external personal computer PC or image information read with the scanner device U1, the image forming apparatus U performs color conversion processing and calibration correction processing using the calibration LUT. In the case where the number of continuous tone level differences of the received image information is smaller than the number of continuous tone level differences that may be processed at the image forming apparatus body U3, the image forming apparatus U performs continuous tone level difference interpolation processing (gradation processing) for extending the number of continuous tone level differences of the image information. Therefore, with execution of the gradation processing, the continuous tone is changed finely, and the image quality increases compared to the case where gradation processing is not performed.

Figures 9A, 9B, 9C:
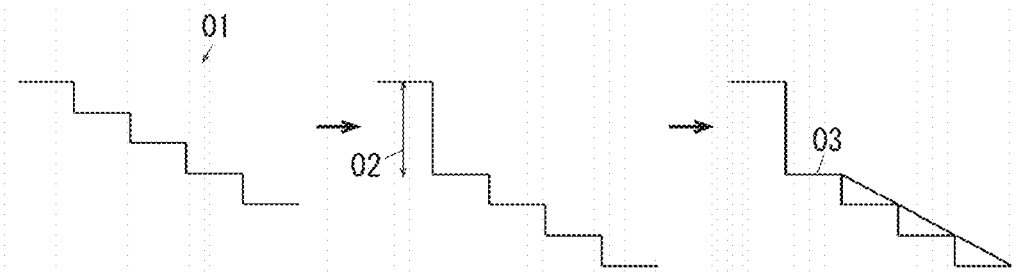
FIGS. 9A to 9C are explanatory diagrams of an image process according to a related art.

FIGS. 9A to 9C are explanation diagrams of an image process according to a related art. FIG. 9A is an explanatory diagram illustrating an example of the density of a pixel of an original image. FIG. 9B is an explanatory diagram of a state after color profile data and a calibration LUT are applied to the image illustrated in FIG. 9A. FIG. 9C is an explanatory diagram of a case where gradation processing is performed for the image illustrated in FIG. 9B.

In a related art, for execution of gradation processing on an image obtained after color conversion and calibration correction are performed, a fixed value is used as the interpolation threshold Ca. Therefore, as illustrated in FIG. 9A, after color conversion and calibration correction are applied to a continuous tone image part 01 in which the density changes by one level, when a density difference 02 exceeds the interpolation threshold Ca, gradation processing may not be performed for a run 03, for which gradation processing should be performed. As described above, depending on the color profile and the calibration LUT, gradation processing may be or may not be performed. Thus, a reliable image quality may not be obtained, and an image quality defect such as unevenness in a continuous tone image part may occur. However, if a large interpolation threshold Ca is set, gradation processing may be performed for a natural image or the like in which color changes greatly, which is a part for which gradation processing is not necessary.

In contrast, in the first exemplary embodiment, the interpolation threshold Ca is calculated in accordance with color profile data and a calibration LUT. Therefore, the interpolation threshold Ca is updated in accordance with a change in the color profile and update of the calibration LUT. Thus, a situation in which gradation processing is not performed for a run for which gradation processing should be performed or a situation in which unnecessary gradation processing is performed, may be reduced. Consequently, compared to a related art in which a fixed value is used as the interpolation threshold Ca for determining whether or not to perform gradation processing, the image quality may be improved.

Figures 10A, 10B:
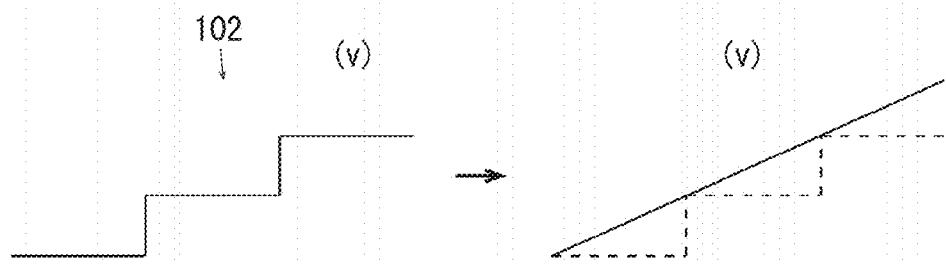
FIGS. 10A to 10D are explanatory diagrams of an image processing method.
Figures 10C, 10D:
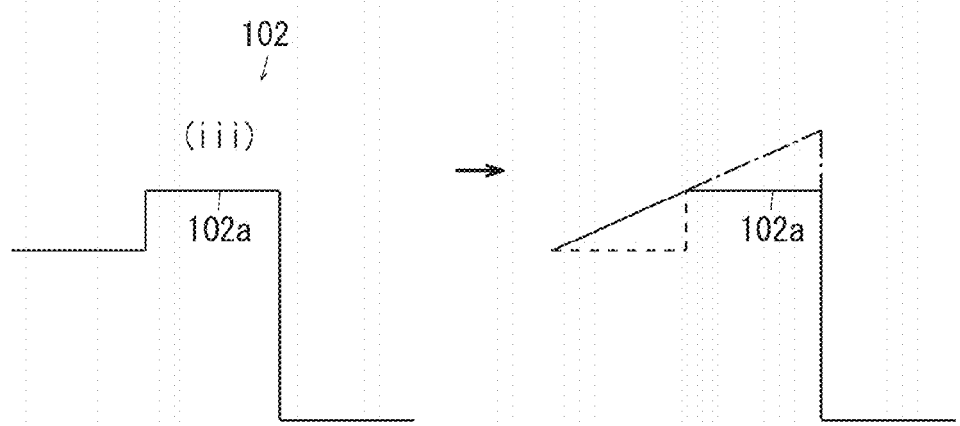

FIGS. 10A to 10D are explanatory diagrams of an image processing method. FIG. 10A is an explanatory diagram of a continuous tone image before gradation processing is performed in the case (v). FIG. 10B is an explanatory diagram of a continuous tone image after gradation processing is performed for the continuous tone image illustrated in FIG. 10A. FIG. 10C is an explanatory diagram of an end portion of a continuous tone image before gradation processing is performed in the case (iii). FIG. 10D is an explanatory diagram of an end portion of a continuous tone image after gradation processing is performed for the continuous tone image illustrated in FIG. 10C.

FIGS. 11A to 11C are explanatory diagrams of an image processing method. FIG. 11A is an explanatory diagram illustrating an example of a continuous tone image in the case (vii). FIG. 11B is an explanatory diagram illustrating an example of a continuous tone image in the case (iv). FIG. 11C is an explanatory diagram illustrating an example of a continuous tone image in the case (v).

Figure 12A:
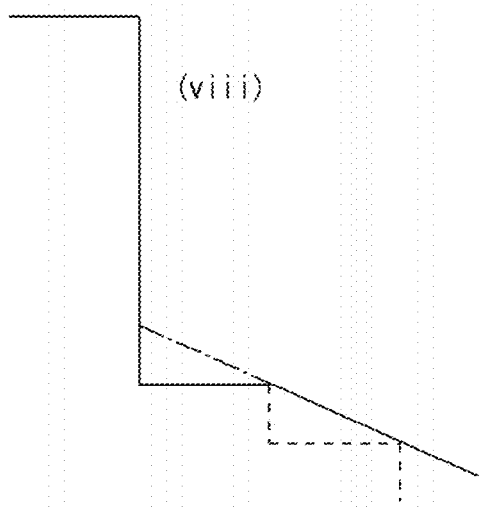
FIGS. 12A to 12D are explanatory diagrams of an image processing method.
Figure 12B:
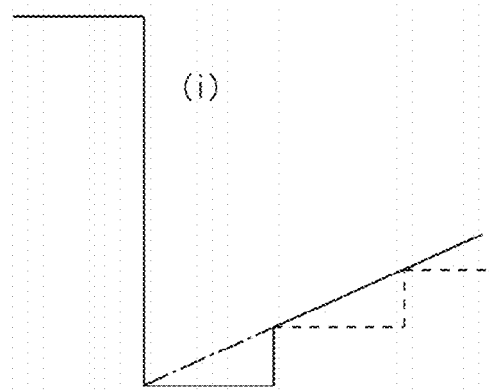
Figure 12C:
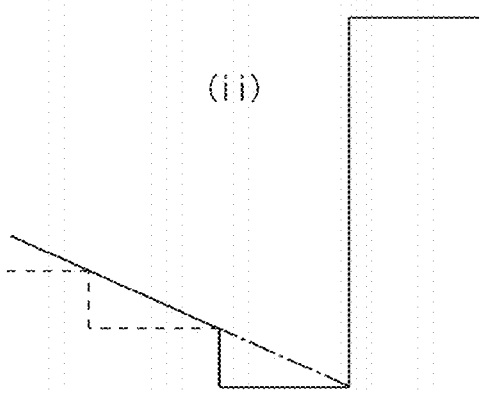
Figure 12D:
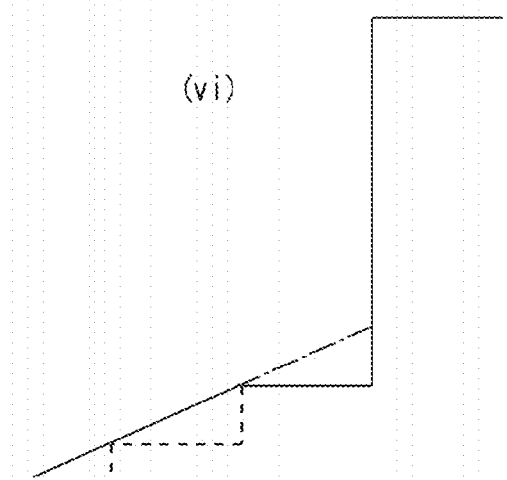

FIGS. 12A to 12D are explanatory diagrams of an image processing method. FIG. 12A is an explanatory diagram illustrating an example of a continuous tone image in the case (viii). FIG. 12B is an explanatory diagram illustrating an example of a continuous tone image in the case (i). FIG. 12C is an explanatory diagram illustrating an example of a continuous tone image in the case (ii). FIG. 12D is an explanatory diagram illustrating an example of a continuous tone image in the case (vi).

Referring to FIGS. 10A and 10B, inside the continuous tone image part 102, the case (v) in the determination by the density difference determination unit C413 is met, and continuous tone level difference interpolation processing is performed such that density in each run is changed continuously. Even in the related art, such continuous tone level difference processing is performed. However, as illustrated in FIG. 10C, in the case where an end portion 102a of the continuous tone image part 102 is adjacent to a low-density image part such as a blank part (background part) or a high-density image such as a solid image, that is, in the case (iii), the density difference is large, and it is determined that the image is a natural image. Therefore, gradation processing is not performed. Thus, gradation processing represented by a solid line in FIG. 10D is performed for the end portion 102a for which gradation processing should be performed as illustrated by a one-dot chain line in FIG. 10D. Therefore, gradation processing according to the related art makes gradation conspicuous in the end portion of the continuous tone image part 102, which appears to be an image quality defect.

In contrast, in the first exemplary embodiment, in the cases (iii), (iv), (v), and (vii), that is, even for an end portion of the continuous tone image part 102 that is adjacent to a low-density part such as a blank part, as illustrated in FIG. 10D and FIGS. 11A to 11C, and even for an end portion of the continuous tone image part 102 that is adjacent to a high-density part such as a solid image as illustrated in FIGS. 12A to 12D, gradation processing represented by a one-dot chain line is performed. Therefore, compared to the case where gradation processing is not performed for a case where there is a density difference between an end portion of the continuous tone image part 102 and an outside region of the continuous tone image part 102, degradation of the image quality may be reduced.

In the cases (iii), (iv), (vi), and (viii), unlike the cases (i), (ii), (v), and (vii), density does not change continuously on a side where a run at an end increases, and density changes, so to speak, discontinuously, on a side of a blank part or a solid part. Therefore, instead of gradation processing similar to the cases (i), (ii), (v), and (vii), gradation processing (prediction interpolation processing) is performed such that a density change from a side of the continuous tone image part 102 on which density continuously changes is extrapolated (predicted) using a predetermined change rate. A change rate may be set by a user, and may be changed in accordance with the purpose, preference, or the like of the user.

Figure 13:
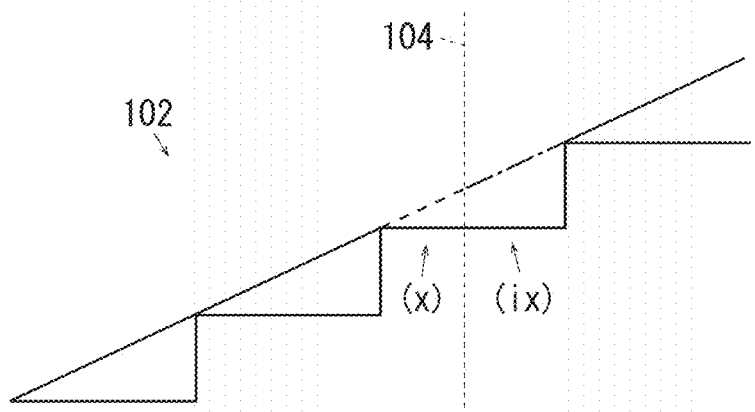
FIG. 13 is an explanatory diagram of an image process for a border part of divided regions in the first exemplary embodiment.

FIG. 13 is an explanatory diagram of an image process for a border part of divided regions in the first exemplary embodiment.

Referring to FIG. 13, in the case where the image region A1 is divided into divided regions A2 and processed as in the first exemplary embodiment, when the continuous tone image part 102 stretches over a border 104 of the divided regions A2, a run stretching over the border 104 is divided into the divided regions A2 and processed separately. One end of each of the divided runs is an end of the divided region A2. Therefore, a divided front end portion is processed in an unfixed state while the divided region A2 is being processed. Thus, the run length of an unspecified part is unspecified, and it is unspecified whether an adjacent pixel is continuous to the continuous tone image part 102 or a natural image. Therefore, in a related art, gradation processing is not performed for a part of a run stretching over the border 104 for which gradation processing should be performed as illustrated by a broken line in FIG. 13. Consequently, uneven gradation occurs in a border part of the divided regions A2, and the image quality is degraded.

In contrast, in the first exemplary embodiment, in the cases (ix) and (x), when the run length N1 is equal to or more than the threshold (interpolation target run length) Na, gradation processing is performed as represented by a one-dot chain line in FIG. 13. Therefore, compared to a related art in which gradation processing is not performed for a border part in the case where image information is divided into plural divided regions A2 and processed, a degradation in the image quality of the border part may be reduced.

Furthermore, in the first exemplary embodiment, for determination as to whether or not to perform gradation processing, a larger interpolation target run length Na is set as the density C0 of a run increases. Gradation processing becomes inconspicuous and a difference between execution or non-execution of gradation processing becomes unclear as the density C0 of a run increases. Therefore, in the first exemplary embodiment, the interpolation target run length Na increases and gradation processing is less likely to be performed as the density C0 increases. In particular, in the case where the density C0 reaches 30%, gradation processing is not performed. Therefore, in the first exemplary embodiment, gradation processing is not performed for a run for which the necessity of gradation processing is low. Consequently, compared to the case where gradation processing is always performed, the processing speed may be increased while a degradation in the image quality being reduced.

MODIFICATIONS

Exemplary embodiments of the present invention have been described above. However, the present invention is not limited to the exemplary embodiments described above, and various modifications may be made within the scope of the present invention described in claims. Modifications (H01) to (H04) of the present invention will be described below.

(H01) In the foregoing exemplary embodiments, a multifunction machine is illustrated as an example of an image forming apparatus. However, the present invention is not limited to this. For example, an image forming apparatus may be a copying machine, a facsimile machine, or a printer.

(H02) In the foregoing exemplary embodiments, the image forming apparatus U having a configuration in which developer of four colors is used is described. However, the present invention is not limited to this. For example, the image forming apparatus U may be an image forming apparatus of a single color or a multi-color image forming apparatus of three or smaller number of colors or five or larger number of colors may be used.

(H03) In the foregoing exemplary embodiments, an image process in an image forming apparatus is described as an example. However, the present invention is not limited to this. A configuration in which there is a continuous tone level difference between an input image and an output image, for example, an image processing unit that interpolates a continuous tone level difference in the case where input image data is a low continuous tone image and an output display has a high resolution may also be used.

(H04) In the foregoing exemplary embodiments, an image process for storing a continuous tone level difference in the case where the number of bits, that is, the number of density level differences (number of continuous tones), increases, is described. However, the present invention is not limited to this. For example, even if the number of continuous tones does not increase, gradation processing for correction may be performed for a continuous tone image where the density changes in a step manner such that the density changes continuously.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   at least one processor configured to execute:
   a determination unit configured to determine an end of a continuous tone image part in which a density changes continuously, the continuous tone image part being included in image information;
   a continuous tone processing unit configured to perform, in a first case where a number of levels of density of a print image in the image forming apparatus is larger than a number of levels of density of the image information, continuous tone processing causing a density of a pixel group, in which adjacent pixels have a same density, to be changed such that the adjacent pixels instead have more continuously changing differing densities, when increasing the number of levels of the density in the determined end of the continuous tone image part, to thereby generate continuous tone processed print image information, wherein the continuous tone processing unit is further configured to, in a second case where a first density difference between a density of a pixel adjacent to one end of the pixel group in a direction in which the pixels in the pixel group are adjacent to each other and the density of the pixel group reaches a predetermined density difference and a second density difference between a density of a pixel adjacent to another end of the pixel group and the density of the pixel group does not reach a predetermined density difference, perform continuous tone processing causing the density of the pixel group to be changed continuously and more than in the first case.

2. The image forming apparatus according to claim 1, further comprising:
   a selection unit configured to select a density change in the continuous tone processing from among a plurality of predetermined change rates.

3. The image forming apparatus according to claim 1, wherein the print image and the image information comprise data of a plurality of different colors.

4. An image processing method comprising:
   determining and end of a continuous tone image part in which a density changes continuously, the continuous tone image part being included in image information; and performing, in a first case where a number of levels of density of a print image in a image forming apparatus is larger than a number of levels of density of the image information, continuous tone processing causing a density of a pixel group, in which adjacent pixels have a same density, to be changed such that the adjacent pixels instead have more continuously changing differing densities, when increasing the number of levels of the density in the determined end of the continuous tone image part, to thereby generate continuous tone processed print image information; and performing, in a second case where a first density difference between a density of a pixel adjacent to one end of the pixel group in a direction in which the pixels in the pixel group are adjacent to each other and the density of the pixel group reaches a predetermined density difference and a second density difference between a density of a pixel adjacent to another end of the pixel group and the density of the pixel group does not reach a predetermined density difference, continuous tone processing causing the density of the pixel group to be changed continuously and more than in the first case.

* * * * *